United States Patent [19]
Moore et al.

[11] 3,782,401
[45] Jan. 1, 1974

[54] SHUT-OFF VALVE ASSEMBLY

[75] Inventors: Glenn E. Moore; Robert C. Carl, both of Cincinnati, Ohio

[73] Assignee: Dover Corporation, Cincinnati, Ohio

[22] Filed: July 20, 1972

[21] Appl. No.: 273,394

Related U.S. Application Data

[62] Division of Ser. No. 55,436, July 16, 1970, abandoned.

[52] U.S. Cl. .................. 137/68, 174/84 S, 285/231, 285/348, 285/375
[51] Int. Cl. .......................... F16k 17/36, F16l 21/02
[58] Field of Search.................... 285/224, 231, 233, 285/302, 347; 137/68; 174/84 S

[56] References Cited
UNITED STATES PATENTS
1,206,658  11/1916  Berryman ......................... 285/231
2,521,127  9/1950  Price .............................. 285/302 X
3,223,438  12/1965  De Cenzo ....................... 285/347 X
3,489,160  1/1970  Moore ............................. 137/68 X
3,515,157  6/1970  Milo ................................ 137/75 X FOREIGN PATENTS OR APPLICATIONS
841,135  2/1939  France .............................. 285/231
899,964  6/1962  Great Britain .................... 285/231

Primary Examiner—Martin P. Schwadron
Assistant Examiner—Richard Gerard
Attorney—Kinney & Schenk

[57] ABSTRACT

A shut-off assembly has a tubular member supported thereby for connection to a fixed conduit of a pump pedestal so that the tubular member may move with respect to the shut-off valve assembly both axially and pivotally relative to its axis.

10 Claims, 6 Drawing Figures

INVENTORS
GLENN E. MOORE
ROBERT C. CARL

BY *Kinney and Schenk*

ATTORNEYS

INVENTORS
GLENN E. MOORE
ROBERT C. CARL
BY Kinney and Schenk
ATTORNEYS

SHUT-OFF VALVE ASSEMBLY

This is a division of application Ser. No. 55,436, filed July 16, 1970 and since abandoned.

In U.S. Pat. No. 3,489,160 to Moore, there is shown an emergency shut-off valve assembly. The assembly includes a tubular member, which extends above the ground and has a weakened portion formed therein by a groove so that the tubular member can shear to cause closing of the valve when subjected to a predetermined force.

In the aforesaid Moore patent, a rigid connection is formed between the tubular member having the weakened portion and a conduit connected to the dispensing system supported by the pump pedestal. This rigid connection between the tubular member having the weakened portion and the conduit has previously been made by a presser type connection or a union type connection.

If the installer fails to tighten the presser type connection sufficiently, it is possible for this connection to slip off the upper end of the tubular member having the weakened portion whenever the pump pedestal unit is subjected to an impact. If this should occur, the tubular member will not shear at the weakened portion. As a result, the valve of the shut-off valve assembly of the aforesaid Moore patent will not close when there is a break in the connection between the valve assembly and the conduit of the dispensing system of the pump pedestal unit.

This failure of the valve to close results in the gasoline flowing out of the valve assembly due to the break in the connection between the valve assembly and the conduit of the dispensing system. This results in any fire, which might be produced, being fed by the gasoline so that the shut-off valve of the aforesaid Moore patent cannot accomplish its desired function until the fusible metal link melts.

With the union type connection, it is necessary that the connecting conduit or pipe between the tubular member having the weakened portion and the dispensing system of the pump pedestal unit must be cut almost to the exact length. This creates a problem for the installer since it is difficult for the installer to precisely obtain the correct length.

If the precise length is not obtained, the tightening down of the union may cause the tubular member having the weakened portion to break due to the torque exerted thereon. Even if the installer should not exert sufficient torque to break the tubular member having the weakened portion during the tightening, this torque creates a tension or a preload on the tubular member having the weakened portion. Accordingly, the tubular member having the weakened portion breaks under less force than that for which it is designed because of the preload thereon.

Additionally, when tightening the union nut, it is sometimes difficult to see the union ring or the union fittings. As a result, a scratch may occur on one of these so that there will be leakage between the metal to metal seal.

In the winter time when the ground freezes and thaws, the pedestal pump unit moves up and down. Because of the rigid connection between the dispensing system of the pump pedestal unit and the tubular member having the weakened portion, the possibility exists that damage can occur to the valve assembly or that the tubular member can be weakened by this movement of the pump pedestal unit so that it will shear under a lighter impact than that for which it is designed.

The present invention satisfactorily overcomes the foregoing problems so that the shut-off valve assembly of the aforesaid Moore patent may be easily coupled or connected to the dispensing system of the pump pedestal unit. The present invention employs a coupling between the tubular member having the weakened portion and the conduit of the dispensing system of the pump pedestal unit; the coupling can move both axially and pivotally relative to its axial movement while still obtaining the desired results from the shut-off valve assembly.

Thus, when using the present invention, it is not necessary to cut the connecting pipe to the exact length. Furthermore, in most embodiments, there is no torque exerted on the tubular member having the weakened portion during assembly of the coupling. Thus, there is no preload on the tubular member having the weakened portion so that it will shear only when subjected to the design force.

Furthermore, the flexible type connection between the tubular member having the weakened portion and the conduit of the dispensing system of the pump pedestal unit is such that movement of the pump pedestal unit because of the thawing and freezing of the ground in the winter time does not affect the tubular member having the weakened portion. Thus, there is no possibility of any damage to the valve assembly because of the movement of the pump pedestal unit due to the movement of the ground.

Additionally, the present invention enables alignment between the various members to not have to be as precise as when using a rigid connection. Thus, because of the coupling being able to pivot or move angularly relative to its axis, the alignment between the tubular member having the weakened portion and the conduit of the dispensing system of the pump pedestal unit does not have to be as precise. This reduces installation cost.

An object of this invention is to provide a shut-off valve assembly having a unique coupling.

Another object of this invention is to provide a shut-off valve assembly having a coupling in which relative movement between the pump pedestal unit and the shear section of the shut-off valve assembly can occur without any damage.

A further object of this invention is to provide a shut-off valve assembly having a coupling that allows the shutoff valve assembly to be more easily connected to the dispensing systm of the pump pedestal unit.

Still another object of this invention is to provide a connection between a shut-off valve assembly and a pump pedestal unit in which the shear section of the shut-off valve assembly is not preloaded during installation.

Other objects, uses, and advantages of this invention are apparent upon a reading of this description, which proceeds with reference to the drawings forming part thereof and wherein.

Figure 1:
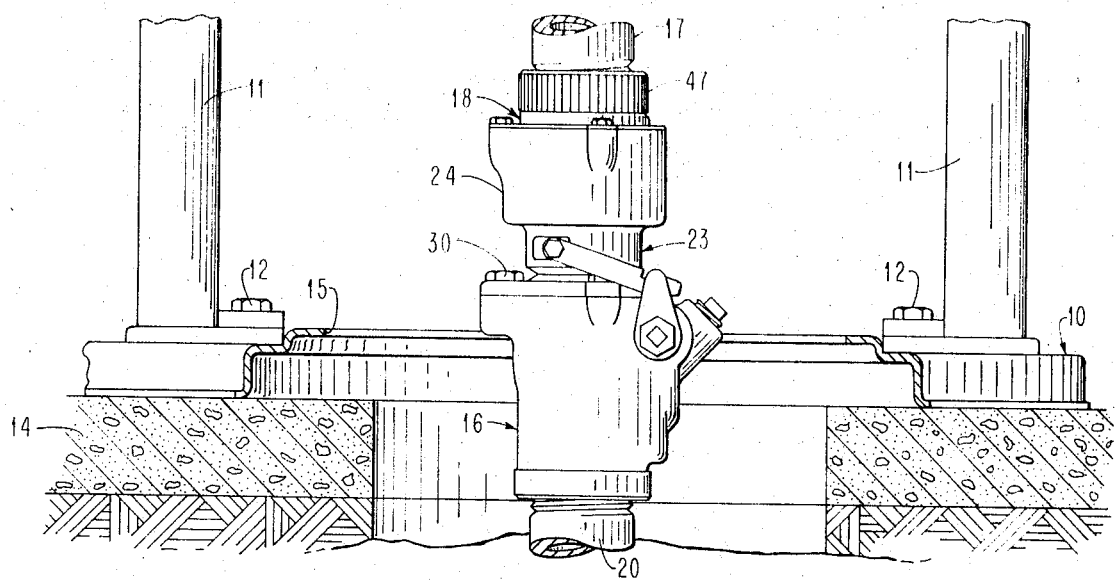
FIG. 1 is a side elevational view, partly in section, of the bottom end portion of a pedestal and the shut-off valve assembly including the coupling of the present invention that connects the valve assembly of the dispensing system mounted on the pedestal.

Referring to the drawings and particularly FIG. 1, there is shown a base frame 10 having the bottom ends of posts 11 secured thereto by bolts 12. The base frame 10, whice is seated on a foundation 14, has an opening 15 therein. The opening 15 permits the base frame 10 to fit over and surround a shut-off valve assembly 16, which is more particularly shown and described in the aforesaid Moore patent. The base frame 10 and the post unit are known as a pedestal.

The shut-off valve assembly 16 has a conduit 17 connected thereto by a coupling 18. The conduit 17 extends upwardly from the coupling 18 for connection to a dispensing system, which is mounted on the support posts 11.

The valve assembly 16 includes a hollow casing or housing 19 having a conduit 20 threaded in its bottom or lower end. The conduit 20 leads from the casing 19 to a storage tank (not shown), which is buried beneath the foundation 14.

The casing or housing 19 has an opening 21 in its upper end through which an annular portion 22 of a tubular member 23 may be disposed. The tubular member 23 has its upper end 24 enlarged and in a bell shape to receive the lower end of the coupling 18 whereby the coupling 18 is slidably supported by the tubular member 23.

The annular portion 22 of the tubular member 23 has a circular recess formed at its end to receive a ring 25, which is preferably formed of brass. The ring 25 functions as a valve seat and is secured to the tubular member 23 by suitable means such as press fitting, for example.

The tubular member 23 has an integral flange 26, which is adapted to engage upper surface 27 of the casing 19. The upper surface 27 has angularly spaced threaded openings 28 therein with which openings 29 in the flange 26 are aligned to properly position the tubular member 23. Screws 30 are threaded into the openings 28 through the openings 29 to attach the tubular member 23 to the casing 19.

A seal 31 is compressed between the tubular member 23 and the casing 19 when the tubular member 23 is attached to the casing 19 to prevent fluid leakage therebetween. The passage in the tubular member 23 provides communication from the interior of the casing 19 through the interior of the coupling 18 to the conduit 17.

A valve 32 is disposed within the casing or housing 19 for cooperation with a valve seat, which is formed by the ring 25. The valve 32 is mounted on one end of a carrier 33, which is attached by bifurcated ends 34 to a pivotally mounted shaft or stem 35 for movement therewith. This movement is more particularly shown and described in the aforesaid Moore patent.

As more particularly shown and described in the aforesaid Moore patent, the shaft 34 is connected to the tubular member 23. This connection includes a fusible link.

The tubular member 23 has an annular groove 36 therein to form a weakened portion of the tubular member 23. The tubular member 23 shears at the groove 36, which forms the weakened portion thereof, when subjected to a predetermined force. It should be understood that the valve 32 can be moved to the closed position in the same manner as described in the aforesaid Moore patent even if the tubular member 23 does not shear at the groove 36 in certain situations.

The coupling 18 is a hollow tubular member having an outer diameter less than the inner diameter of the enlarged upper end 24 of the tubular member 23. The coupling 18 has axially spaced projections 37 and 38 adjacent the lower end thereof to form a groove 39 therebetween. Each of the projections 37 and 38 is preferably continuous and has a diameter slightly less than the inner diameter of the enlarged upper end 24 of the tubular member 23.

An O-ring 40 is disposed within the groove 39 and forms a fluid seal between the coupling 18 and the tubular member 23. By being disposed within the froove 39, the O-ring 40 is movable with the coupling 18.

A compression spring 41 is positioned within the enlarged upper end 24 of the tubular member 23. The spring 41 has its lower end resting on a flat annular surface 42 of the tubular member 23 and its upper end bearing against the lower surface of the lower projection 37. The spring 41 provides an electrically conducting or connecting path between the coupling 18 and the tubular member 23 so that a specific resistance exists across the valve 32 as required by the Underwirters Laboratory.

Because of the relative dimensions of the outer diameter of the coupling 18 with respect to the inner diameter of the enlarged upper end 24 of the tubular member 23, there would be an electrically conducting or connecting path between the coupling 18 and the tubular member 23 without the spring 41 only if the coupling 18 is in its lowermost position within the tubular member 23. The spring 41 insures that there is an electrically conducting or connecting path between the coupling 18 and the tubular member 23 at all times.

The upper axial movement of the coupling 18 is limited by a retaining ring 43, which is secured by bolts 44 to the upper surface of the enlarged upper end 24 of the tubular member 23. The inner diameter of the ring 43 is greater than the outer diameter of the portion of the coupling 18 above the upper projection 38. As a result, the coupling 18 cannot only move axially relative to the retaining ring 43 but also can be pivoted relative to the axis of the tubular member 23 a limited amount such as 3° to 5°, for example. This eliminates the need for the conduit 17 and the tubular member 23 to be perfectly aligned.

The retaining ring 43 has an inner diameter smaller than the diameter of the projection 38. This insures that the coupling 18 is retained within the tubular member 23.

While the retaining ring 43 is shown as a single continuous element, it should be understood that such is not necessary for satisfactory operation. It is only necessary that the axial movement of the coupling 18 be limited while still allowing limited pivoting of the coupling 18. This could be accomplished by employing three segmental arcuate portions with one of the portions being of each of the three bolts 44 rather than using the single continuous ring 43 if desired.

A dust seal 45, which is formed of any suitable flexible material such as felt, for example, is supported on an annular flat surface 46 of the enlarged upper end 24 of the tubular member 23. The annular flat surface 46 supports the dust seal 45 so that the upper surface of the dust seal 45 bears against the lower surface of the retaining ring 43. The dust seal 45 fits snugly against the outer surface of the coupling 18.

The dust seal 45 is employed to prevent any debris from entering between the coupling 18 and the inner surface of the enlarged upper end 24 of the tubular member 23 during installation. Otherwise, debris could enter between the coupling 18 and the inner surface of the enlarged upper end 24 of the tubular member 23 and become lodged between the O-ring 40 and the inner surface of the enlarged upper end 24 of the tubular member 23. This could cause the O-ring 40 to cease to form a fluid seal between the coupling 18 and the enlarged upper end 24 of the tubular member 23.

Because of its flexibility, the dust seal 45 does not have any effect on the pivoting or angular movement of the coupling 18. Only the retaining ring 43 limits this.

In assembling the shut-off valve assembly 16 for connection to the conduit 17 and the conduit 20, the shut-off valve assembly 16 would be connected to the conduit 20. Then, the coupling 18 would be withdrawn from this enlarged upper end 24 of the tubular member 23 by releasing the bolts 44 so that the retaining ring 43 and the dust seal 45 can move with the coupling 18 as it is removed from the tubular member 23.

The coupling 18 may then be secured to the conduit 17 which is part of the dispensing system of the pump pedestal. The pump pedestal would then be mounted.

Next, the coupling 18 would be reinserted within the enlarged upper end 24 of the tubular member 23. Finally, the retaining ring 43 would again be connected to the tubular member 23 by the bolts 44.

In securing the coupling 18 to the conduit 17, the inner surface of the coupling 18 is threaded for cooperation with threads on the outer surface of the conduit 17. Torque may be applied to the coupling 18 through its knurled upper surface 47 (see FIG. 1). Accordingly, the shut-off valve assembly 16 is connected to the conduit 17 without any torque being applied to the tubular member 23.

Therefore, the tubular member 23 is not preloaded. As a result, shearing of the tubular member 23 at the groove 36 will not occur until the design force is exerted above the groove 36.

It should be understood that the upper end 24 has a bell-shape so that the bore of the coupling 18 can be substantially the same diameter as the bore of the lower portion of the tubular member 23. As a result, there is no significant pressure drop therebetween.

Figure 4:
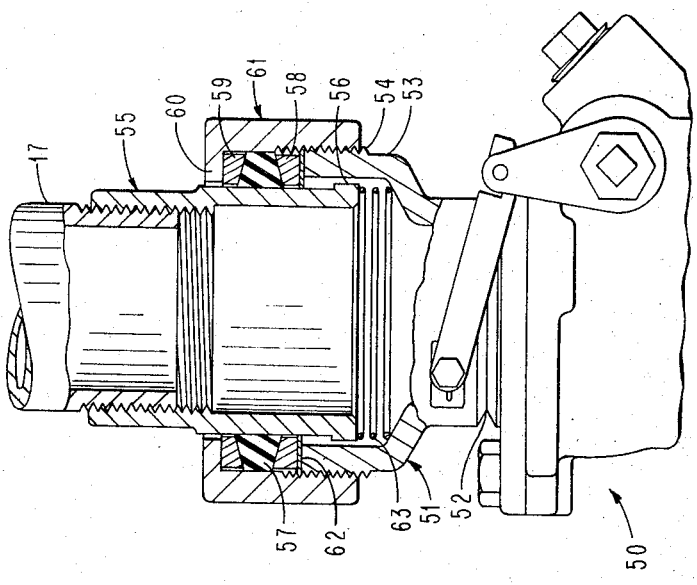
FIG. 4 is a sectional view, partly in elevation, of another form of the coupling of the present invention and showing it connecting the shut-off valve assembly to a conduit of the dispensing system mounted on the pedestal.

Referring to FIG. 4, there is shown a shut-off valve assembly 50, which is the same as the shut-off valve assembly 16 except that the tubular member 23 of the shut-off valve assembly 16 has been replaced by a tubular member 51. The tubular member 51, which has an annular groove 52 therein to form the weakened portion in the same manner as the groove 36 does in the tubular member 23, has an enlarged upper end 53, which is bell-shaped. The enlarged upper end 53 of the tubular member 51 has threads 54 on its outer surface.

A coupling 55, which is threaded to the conduit 17 in the same manner as the coupling 18, has an annular projection or flange 56 on its lower end. The coupling 55 is disposed within the enlarged upper end 53 of the tubular member 51.

The coupling 55 has a packing 57, which is formed of a suitable resilient material such as Buna-n rubber, for example, engaging its outer surface to prevent fluid leakage between the tubular member 51 and the coupling 55. The packing 57 is disposed between a lower gland 58 and an upper gland 59; the glands 58 and 59 are formed of metal.

When a flange 60 of a retaining ring 61, which is threaded on the threads 54 of the tubular member 51, is moved downwardly against the upper surface of the upper gland 59, the packing 57 is squeezed against the outer surface of the coupling 55. The glands 58 and 59 have inclined surfaces, which cooperate with each other to provide a wedging action on the packing 57 when the retaining ring 61 is moved downwardly by turning it.

A seal 62 is disposed between the upper surface of the enlarged upper end 53 of the tubular member 51 and the lower surface of the lower gland 58. This prevents any fluid leakage between the threads 54 and the tubular member 51 and the cooperating threads on the inner surface of the retaining ring 61.

The inner diameter of the flange 60 of the retaining ring 61 is larger than the outer diameter of the coupling 55. Likewise, the outer diameter of the projection 56 is smaller than the inner diameter of the enlarged upper end 53 of the tubular member 51. As a result, the coupling 55 may pivot a small amount such as 3° to 5°, for example, relative to the axis of the tubular member 51. This eliminates any requirement for precise alignment between the conduit 17 and the tubular member 51 in the same manner as mentioned when the coupling 18 is employed with the tubular member 23.

The upper surface of the projection 56 engages the lower surface of the seal 62 to limit the axial movement of the coupling 55. Thus, the coupling 55 is allowed both limited axial and pivotal movement in the same manner as the coupling 18.

In the same manner as described for the coupling 18, there is no torque applied to the tubular member 51 when the coupling 55 is secured to the conduit 17. However, there is some torque applied to the tubular member 51 to properly position the retaining ring 61 on the tublar member 51. This torque is relatively low in comparison with the torque which would be required if the conduit 17 were connected directly to the tubular member 51.

Figure 2:
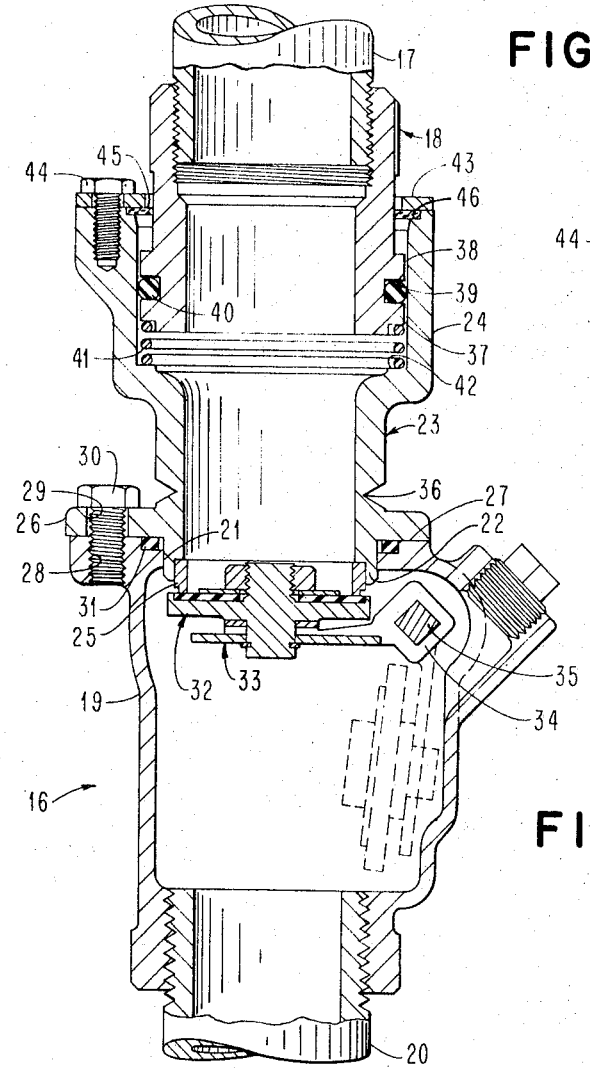
FIG. 2 is a sectional view of the valve assembly in which one form of the coupling of the present invention is used to connect the valve assembly to the conduit of the dispensing system mounted on the pedestal.
Figure 3:
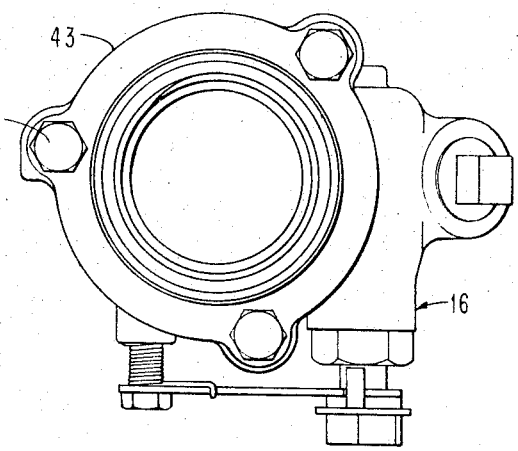
FIG. 3 is a top plan view of the valve assembly including the coupling without the conduit of the dispensing system.

A compression spring 63 is disposed between the lower end of the coupling 55 and the tubular member 51 in a manner similar to that shown for the compression spring 41 in FIG. 2. The compression spring 63 provides the electrically conducting or connecting path between the coupling 55 and the tubular member 51 irrespective of their positions relative to each other.

Figure 5:
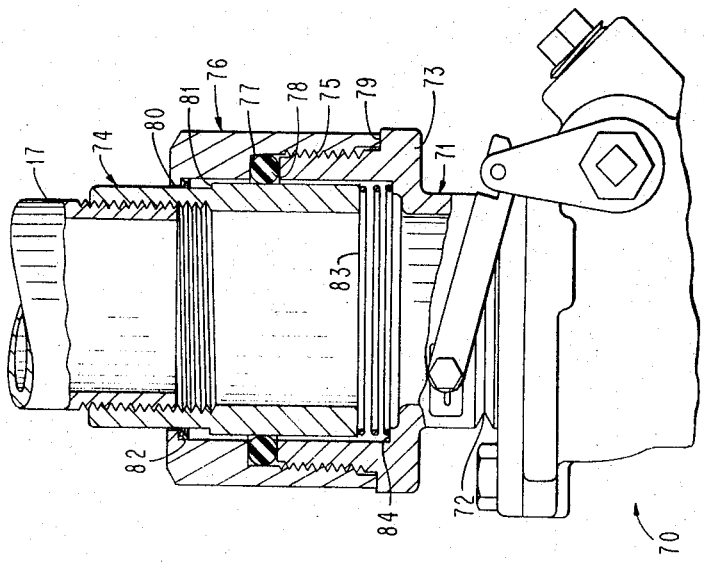
FIG. 5 is a sectional view, partly in elevation, of still another embodiment of the coupling of the present invention and showing it connecting the shut-off valve assembly to a conduit of the dispensing system mounted on the pedestal.

Referring to FIG. 5, there is shown a shut-off valve assembly 70, which is similar to the shut-off valve assembly 16 except that a tubular member 71 is employed instead of the tubular member 23. The tubular member 71 has an annular groove 72 therein to form a weakened portion in the same manner as the annular groove 36 does in the tubular member 23.

The tubular member 71 has an enlarged upper end 73 within which a coupling 74 is slidably supported. The coupling 74 is connected to the conduit 17 in a manner similar to that for connecting the coupling 18 to the conduit 17.

The enlarged upper end 73 of the tubular member 71 has threads 75 on its outer surface for cooperation with threads on an inner surface of a retaining ring 76 to connect the retaining ring 76 to the tubular member 71. The retaining ring 76 has a recess 77 formed in its inner surface and within which an O-ring 78 is disposed.

The O-ring 78 prevents fluid leakage between the coupling 74 and the tubular member 71. The O-ring 78 seals against both the outer surface of the coupling 74 and surfaces of the retaining ring 76. It also seals against the upper surface of the enlarged upper end 73 of the tubular member 71. By this arrangement, there is no fluid leakage along the threads. If desired, an additional seal may be provided between a flat annular surface 79 on the tubular seal 71 and the bottom surface of the retaining ring 76.

The upper end of the retaining ring 76 has a flange 80 for cooperation with a shoulder 81 on the outer surface of the coupling 74 to limit the axial movement of the coupling 74 relative to the tubular member 71. The diameter of the flange 80 is greater than the outer diameter of the coupling 74 to allow pivoting of the coupling 74 since the outer diameter of the coupling 74 also is smaller than the inner diamter of the upper enlarged end 73 of the tubular member 71. Accordingly, the coupling 74 is capable of both axial and pivotal movement for connecting the conduit 17 to the shut-off valve assembly 70.

A dust seal 82, which is preferably formed of felt, is supported from the lower surface of the flange 80 and fits snugly against the outer surface of the coupling 74. The dust seal 82 serves to prevent any debris from entering during installation that would cause the O-ring 78 to not form the fluid seal.

A compression spring 83 is disposed between the lower end of the coupling 74 and a flat surface 84 of the tubular member 71. The compression spring 84 provides an electrically connecting or conducting path between the coupling 74 and the tubular member 71 in the same manner as the compression spring 41 does between the coupling 18 and the tubular member 23.

Figure 6:
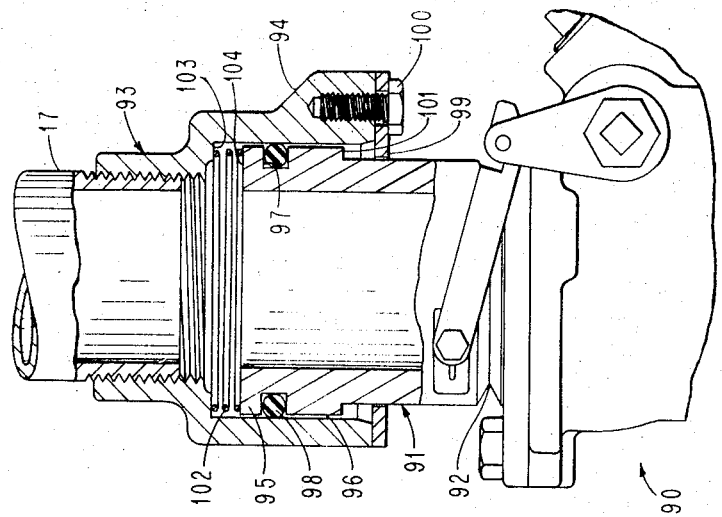
FIG. 6 is a sectional view, partly in elevation, of a further modification of the coupling of the present invention and showing it connecting the shut-off valve assembly to a conduit of the dispensing system mounted on the pedestal.

Referring to FIG. 6, there is shown a shut-off valve assembly 90, which is similar to the valve assembly 16 except for using a tubular member 91 instead of the tubular member 23. The tubular member 91 has an annular groove 92 therein to form a weakened portion in the same manner as the groove 36 does in the tubular member 23.

The shut-off valve assembly 90 is connected to the conduit 17 by a coupling 93, which is slidably supported by the tubular member 91. The coupling 93 has its lower end 94, which is bell-shaped, disposed over the tubular member 91.

The upper end of the tubular member 91 has a pair of annular projections 95 and 96 thereon and axially spaced from each other to form a groove 97 therebetween. The groove 97 has an O-ring 98 supported therein to form a fluid seal between the inner surface of the enlarged lower end 94 of the coupling 93 and the tubular member 91.

Axial movement of the coupling 93 relative to the tubular member 91 is limited by a retaining ring 99, which is secured by bolts 100 to the bottom surface of the enlarged lower end 94 of the coupling 93. The upward axial movement of the coupling 93 relative to the tubular member 91 is limited by the upper surface of the retaining ring 99 engaging lower surface 101 of the lower projection 96 on the tubular member 91.

The inner diameter of the retaining ring 99 is greater than the diameter of the outer surface of the tubular member 91. Likewise, the diameter of each of the projections 95 and 96 is less than the diameter of the inner surface of the enlarged lower end 94 of the coupling 93. Accordingly, the coupling 93 can pivot a small amount such as 3° to 5°, for example, relative to the axis of the tubular member 91.

A compression spring 102 is disposed between a flat annular surface 103 of the coupling 93 and upper surface 104 of the tubular member 91. This provides the required electrically conducting or connecting path between the coupling 93 and the tubular member 91.

While the retaining ring 99 is preferably a single continuous ring, it should be understood that it could be a plurality of spaced arcuate portions in the same manner as previously mentioned for the retaining ring 43. It is only necessary that the upward axial movement of the coupling 93 relative to the tubular member 91 be limited.

When installing the shut-off valve assembly 90 with the coupling 93, no torque is exerted on the tubular member 91. As a result, there is no preload on the tubular member 91 whereby the design force must be applied thereto before the tubular member 91 shears.

An advantage of this invention is that it eliminates torque preloading on the shear section of a shut-off valve assembly. Another advantage of this invention is that it is easier to install. A further advantage of this invention is that it is not a requisite that the conduit from the dispensing system of the pedestal pump unit be aligned with the shear section of the shut-off valve assembly or the length of the conduit from the pump dispensing unit be precise.

For purposes of exemplification, particular embodiments of the invention have been shown and described according to the best present understanding thereof. However, it will be apparent that changes and modifications in the arrangement and construction of the parts thereof may be resorted to without departing from the spirit and scope of the invention.

What is claimed is:

1. A shut-off valve assembly comprising a casing having a valve pivotally mounted therein and movable between open and closed positions, a tubular member having its lower end detachably connected to the upper end of said casing and communicating with said casing, said tubular member having a weakened portion formed therein closely adjacent the lower end thereof, said tubular member having a coupling member slidably supported thereby for axial movement relative to said tubular member, said slidable coupling member being rotatable relative to said tubular member, said slidable coupling member adapted to be connected to a conduit, one of said tubular member and said coupling member having an enlarged end to telescopically receive the other member, the other of said tubular member and said coupling member including a pair of axially spaced projections on the outer surface thereof, said projections forming a groove therebetween, fluid seal means mounted in the groove to cooperate with the inner surface of the enlarged end of said one member and the outer surface of said other member to prevent fluid leakage between said tubular member and said coupling member, limit means mounted at the end of the enlarged end of said one member to limit the axial movement of said other member relative to said one member, said limit means allowing limited pivoting of said other member relative to the axis of the enlarged end of said one member, and means to maintain an electrical conducting path between said tubular member and said coupling member irrespective of the position of said coupling member relative to said tubular member, said maintaining means having one end engaging against one of said projections on said other member and its other end supported by the enlarged end of said one member.

2. The shut-off valve assembly according to claim 1 further including dust seal means cooperating between said tubular member and said coupling member, said dust seal means being supported by the enlarged end of said one member.

3. The shut-off valve assembly according to claim 1 in which said tubular member is formed with the enlarged end to telescopically receive said coupling member.

4. The shut-off valve assembly according to claim 3 in which said spaced projections are on said coupling member for supporting said seal.

5. The shut-off valve assembly according to claim 4 in which said limit means is a retaining ring detachably secured to the end of the enlarged end of said tubular member wherein said retaining ring will engage one of said spaced projections thereby limiting axial movement of said coupling member.

6. The shut-off valve assembly according to claim 1 in which said electrical maintaining means is a spring.

7. The shut-off valve assembly according to claim 1 in which said coupling member has its lower end enlarged to fit over the outer surface of said tubular member in telescoping relation and in which said projections are formed on said tubular member.

8. The shut-off valve assembly according to claim 7 in which said fluid seal means includes a seal supported by said projections on said tubular member and engaging the inner surface of said coupling tubular member.

9. The shut-off valve assembly according to claim 8 in which said limit means is secured to said coupling member.

10. The shut-off valve assembly according to claim 9 in which said electrical maintaining means is a spring.

* * * * *